US012613334B2

(12) United States Patent
Doyle

(10) Patent No.: US 12,613,334 B2
(45) Date of Patent: Apr. 28, 2026

(54) INTEGRATED CIRCUIT TO WAVEGUIDE TRANSITIONAL STRUCTURES AND RELATED SENSOR ASSEMBLIES

(71) Applicant: Magna Electronics, LLC, Southfield, MI (US)

(72) Inventor: Scott B. Doyle, Sudbury, MA (US)

(73) Assignee: Magna Electronics, LLC, Southfield, MI (US)

( * ) Notice: Subject to any disclaimer, the term of this patent is extended or adjusted under 35 U.S.C. 154(b) by 676 days.

(21) Appl. No.: 17/852,324

(22) Filed: Jun. 28, 2022

(65) Prior Publication Data

US 2023/0417904 A1 Dec. 28, 2023

(51) Int. Cl.
*G01S 13/931* (2020.01)
*H01Q 1/32* (2006.01)
*H01Q 13/02* (2006.01)

(52) U.S. Cl.
CPC ......... *G01S 13/931* (2013.01); *H01Q 1/3233* (2013.01); *H01Q 13/02* (2013.01)

(58) Field of Classification Search
CPC ..... G01S 13/931; G01S 13/88; H01Q 1/3233; H01Q 13/02; H01Q 21/005; H01Q 1/2283; H01Q 21/0043; H01P 5/107; H01P 5/022; H01P 3/12; H10W 90/724
USPC ......................................................... 342/14
See application file for complete search history.

(56) References Cited

U.S. PATENT DOCUMENTS 7,132,905 B2 * 11/2006 Sano ...................... H01P 3/121
                                                        333/230
8,779,995 B2 * 7/2014 Kirino ..................... H01Q 3/32
                                                        343/702

8,803,638 B2 * 8/2014 Kildal ..................... H01P 3/087
                                                        333/248
9,153,851 B2 * 10/2015 Nakamura ................ H01P 1/16
9,252,475 B2 * 2/2016 Milyakh ................. H01P 5/107
9,350,063 B2 * 5/2016 Herbsommer ............ H01P 3/16
9,455,486 B2 * 9/2016 Chen ....................... H01P 1/387
9,666,553 B2 * 5/2017 Murugan .............. H10W 44/20

(Continued)

FOREIGN PATENT DOCUMENTS

CN          102931492          2/2015
CN          106207357          12/2016
EP          2832192 B1 *       9/2017    ............... H01Q 1/38

OTHER PUBLICATIONS

Jun. 1, 2023 PCT/US2023/015572—International Search Report & Written Opinion (9 pgs).

(Continued)

*Primary Examiner* — Nuzhat Pervin

(74) *Attorney, Agent, or Firm* — Matthew D. Thayne; Thayne and Davis LLC

(57) ABSTRACT

Antenna structures and assemblies for use in RADAR sensor assemblies and the like. In some embodiments, the assembly may comprise a printed circuit board, an integrated circuit coupled to the printed circuit board on a first surface of the printed circuit board, and an antenna coupled to the printed circuit board on a second surface of the printed circuit board opposite the first surface. A vertical waveguide may extend through the printed circuit board from the integrated circuit to the antenna and may be configured to deliver and/or receive electromagnetic energy between the integrated circuit and the antenna.

20 Claims, 11 Drawing Sheets

(56) References Cited

U.S. PATENT DOCUMENTS

| | | | | |
|---|---|---|---|---|
| 9,666,931 | B2 * | 5/2017 | Suzuki | H01P 5/107 |
| 10,164,344 | B2 * | 12/2018 | Kirino | H01Q 21/005 |
| 10,199,707 | B2 * | 2/2019 | Purden | H01P 5/08 |
| 10,403,954 | B2 * | 9/2019 | Moallem | H01P 5/107 |
| 10,651,559 | B2 * | 5/2020 | Sovero | H01Q 13/103 |
| 11,029,188 | B2 * | 6/2021 | Waelde | G01S 7/35 |
| 11,644,533 | B2 * | 5/2023 | Izadian | G01S 7/41 |
| | | | | 342/26 D |
| 11,757,166 | B2 * | 9/2023 | Gupta | H01P 5/107 |
| | | | | 343/700 R |
| 11,843,166 | B2 * | 12/2023 | Grando | H01Q 21/0006 |
| 2009/0315797 | A1 * | 12/2009 | Rofougaran | H01Q 1/2283 |
| | | | | 343/876 |
| 2010/0060512 | A1 * | 3/2010 | Garrod | H01Q 13/24 |
| | | | | 342/124 |
| 2011/0050356 | A1 * | 3/2011 | Nakamura | H01P 5/107 |
| | | | | 333/26 |
| 2011/0080313 | A1 * | 4/2011 | Wintermantel | G01S 13/4454 |
| | | | | 342/175 |
| 2011/0234472 | A1 * | 9/2011 | Maurer | H10W 44/20 |
| | | | | 343/904 |
| 2012/0187511 | A1 * | 7/2012 | Maurer | H10W 44/20 |
| | | | | 438/118 |
| 2013/0257670 | A1 * | 10/2013 | Sovero | H01Q 13/103 |
| | | | | 343/700 MS |
| 2015/0011168 | A1 * | 1/2015 | Chen | H01Q 21/0006 |
| | | | | 333/1.1 |
| 2016/0079647 | A1 * | 3/2016 | Hasch | H01P 5/107 |
| | | | | 333/26 |
| 2017/0084971 | A1 * | 3/2017 | Kildal | H01Q 21/0087 |
| 2017/0117636 | A1 * | 4/2017 | Sovero | H01Q 13/103 |
| 2017/0187121 | A1 * | 6/2017 | Kirino | H01Q 1/3233 |
| 2018/0003754 | A1 * | 1/2018 | Schrattenecker | G01R 29/10 |
| 2018/0231635 | A1 * | 8/2018 | Woehlte | H01Q 21/0006 |
| 2018/0231657 | A1 * | 8/2018 | Woehlte | H01Q 1/3233 |
| 2018/0287264 | A1 * | 10/2018 | Wälde | H01Q 21/0037 |
| 2018/0321367 | A1 * | 11/2018 | Kirino | G01S 7/41 |
| 2018/0351261 | A1 * | 12/2018 | Kamo | H01Q 21/064 |
| 2019/0107427 | A1 * | 4/2019 | Waelde | G01S 13/88 |
| 2020/0136225 | A1 * | 4/2020 | Shi | G01S 7/032 |
| 2022/0196792 | A1 * | 6/2022 | Hollaender | G01S 7/03 |
| 2022/0256685 | A1 * | 8/2022 | Brandenburg | H01Q 13/22 |
| 2022/0342035 | A1 * | 10/2022 | Smith | G01S 13/426 |
| 2023/0147256 | A1 * | 5/2023 | Koch | H01Q 25/007 |
| | | | | 342/188 |
| 2023/0261389 | A1 * | 8/2023 | Lim | H01Q 13/02 |
| | | | | 343/702 |
| 2023/0417904 | A1 * | 12/2023 | Doyle | H01Q 1/3233 |

OTHER PUBLICATIONS

CN102931492, Feb. 11, 2015, Beijing Institute of Telemetry Technology, Machine Translation (9 pages).

CN106207357, Dec. 7, 2017, Chengdu Xanaway Technology Co., Ltd., Machine Translation (58 pages).

* cited by examiner

200

240b
235b
235a
235
220
240a
225
235
235a
235b
240b 230
240b
232
240b

Y

X

INTEGRATED CIRCUIT TO WAVEGUIDE TRANSITIONAL STRUCTURES AND RELATED SENSOR ASSEMBLIES

SUMMARY

Sensor modules for automotive use typically use an integrated circuit—such as a monolithic microwave integrated circuit (MMIC)—that couples to a microstrip line that feeds a waveguide. Connecting the MMIC package to the waveguide using a microstrip line, however, has several drawbacks, which can lead to increased cost and reduced performance.

The present inventors have therefore determined that it would be desirable to provide apparatus, systems, and methods that overcome one or more of the foregoing limitations and/or other limitations of the prior art. In some embodiments, the inventive concepts disclosed herein may therefore provide sensor modules/assemblies, or components of such modules/assemblies, that directly couple the MMIC or other integrated circuit with the waveguide. For example, the MMIC package may be configured to direct radiation directly into a waveguide structure without any intermediate circuitry in some embodiments. This may provide several benefits, including but not limited to the following.

The substrate to which the MMIC or other integrated circuit is attached need not, in some preferred embodiments, have properties consistent with creating a microstrip line on its surface. This may reduce circuit board cost. In addition, avoiding use of a microstrip line and associated launch may, in some embodiments, be avoided, which may improve radar performance.

In addition, various features and/or inventive concepts disclosed herein may allow the MMIC be on the same side as the rest of the circuitry, which may result in simpler circuit board assembly and/or lower cost.

Further, the signals from the MMIC or other integrated circuit may, in some embodiments, no longer be constrained in their direction, as they can be routed directly under the MMIC if desired.

Disclosed herein are therefore various components or features of sensor assemblies that may facilitate transitioning or launching electromagnetic energy from an integrated circuit, such as MMIC, into a waveguide structure, such as a waveguide formed within a printed circuit board to which the integrated circuit is mounted. In preferred embodiments, such assemblies, or any of the individual structures/features of such assemblies, may be used in RADAR or other sensor modules for vehicles. However, it is contemplated that the inventive features and principles disclosed herein may also find benefit in other industries and/or types of sensor assemblies.

In a more particular example of a vehicle sensor assembly according to some embodiments, the assembly may comprise a printed circuit board comprising a first surface and a second surface opposite the first surface. An integrated circuit or other EM-generating element, such as monolithic microwave integrated circuit, may be coupled to the printed circuit board on the first surface. A waveguide may be positioned to extend through the printed circuit board from the first surface to the second surface. The assembly may further comprise an antenna structure. The waveguide may be configured to receive electromagnetic energy from the monolithic microwave integrated circuit and inject the electromagnetic energy into the antenna structure.

In some embodiments, the waveguide may comprise a ridge waveguide comprising at least one ridge protruding into the waveguide and extending along the waveguide between the first surface and the second surface. In some such embodiments, the waveguide may comprise two ridges, such as two opposing ridges that may face each other, protrude into the waveguide, and extend along the waveguide between the first surface and the second surface.

Some embodiments may further comprise a ball grid array package comprising an array of solder balls electrically coupling the monolithic microwave integrated circuit to the printed circuit board. In some embodiments, the waveguide may comprise a ridge waveguide comprising a ridge protruding into the waveguide and extending along the waveguide between the first surface and the second surface. In some such embodiments, the ball grid array package may comprise a signal ball, which may be positioned on the ridge.

In some embodiments, the monolithic microwave integrated circuit may comprise a coplanar waveguide transmission line and a pair of chamfers extending between opposite sides of the coplanar waveguide transmission line. The chamfers may be formed, for example, within a conductive plate of the monolithic microwave integrated circuit. In some such embodiments, one or both chamfers of the pair of chamfers may extend at least partially within a footprint of the waveguide above the waveguide. In some embodiments, one or both chamfers of the pair of chamfers may extend wholly within the footprint of the waveguide.

In an example of a sensor assembly according to some embodiments, the assembly may comprise a printed circuit board; and an integrated circuit coupled to the printed circuit board on a first surface of the printed circuit board. An antenna, such as a waveguide structure comprising radiating antenna slots, may be coupled to the printed circuit board on a second surface of the printed circuit board opposite the first surface. A waveguide may also extend through the printed circuit board from the integrated circuit to the antenna. The waveguide may be configured to deliver electromagnetic energy between the integrated circuit and the antenna, preferably directly therebetween.

Some embodiments may further comprise an array of electrical coupling elements, such as a ball grid array, which may be used to electrically couple the integrated circuit to the printed circuit board.

In some embodiments, the waveguide may comprise at least one ridge extending along the waveguide.

In some embodiments, one of the balls of the ball grid array, such as the signal ball of the array, may be positioned within a footprint of a ridge of the at least one ridge.

Some embodiments may further comprise an integrated circuit cover positioned adjacent to the integrated circuit, which may be configured to inhibit stray electromagnetic radiation from the integrated circuit. The integrated circuit may be positioned in between the integrated circuit cover and the printed circuit board. The cover may comprise a plurality of adjacent, spaced, columns that may extend to and/or be used to couple the cover to the MMIC or other integrated circuit.

In some embodiments, a groove may be formed within the printed circuit board adjacent to but spaced apart from the integrated circuit. This groove may be configured to prevent or at least inhibit stray electromagnetic radiation from the integrated circuit.

In an example of a vehicle RADAR sensor assembly, the assembly may comprise a printed circuit board comprising a first surface and a second surface opposite the first surface;

a monolithic microwave integrated circuit; and a ball grid array package comprising one or ball balls or other electrical coupling elements electrically coupling the monolithic microwave integrated circuit to the printed circuit board on the first surface. A waveguide may be positioned adjacent to the monolithic microwave integrated circuit and may extend through the printed circuit board from the first surface to the second surface. In some embodiments, a ridge may protrude from and/or extend along the waveguide. An antenna structure, such as preferably an antenna structure comprising one or more waveguides, may be coupled to the second surface of the printed circuit board and may be configured to facilitate transfer of electromagnetic energy to and from the monolithic microwave integrated circuit.

In some embodiments, the ball grid array package may comprise at least one signal ball, which may be positioned within a footprint of the ridge.

In some embodiments, the ridge may be defined by at least substantially parallel opposing sidewalls.

In some embodiments, the ridge may decrease in width from a base of the ridge to a tip of the ridge opposite the base.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
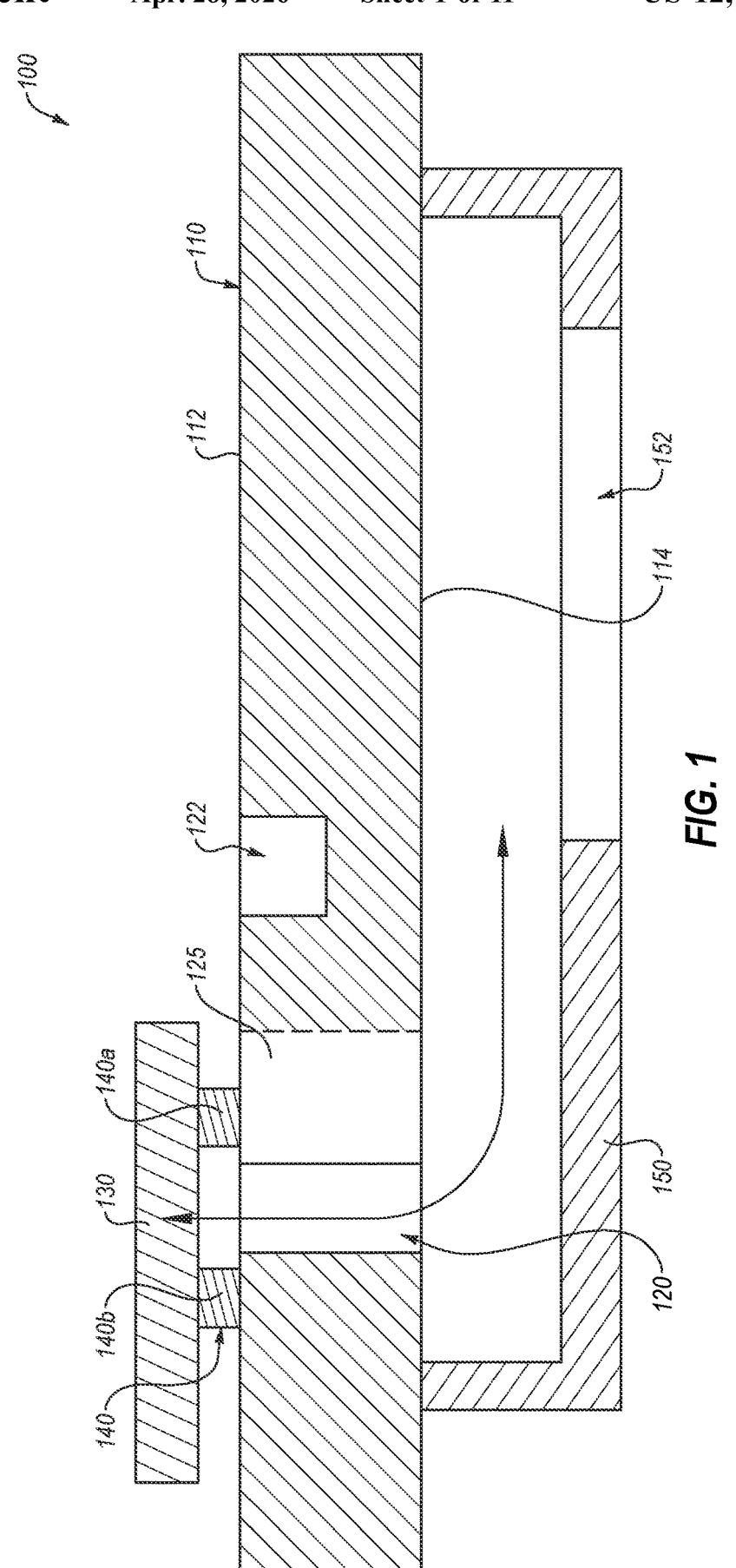
FIG. 1 is a cross-sectional view of a waveguide assembly according to some embodiments.

FIG. 1 depicts a sensor assembly 100, such as a RADAR sensor assembly for a vehicle, for example, according to some embodiments. Assembly 100 comprises a printed circuit board 110. Printed circuit board 110 comprises a first surface 112 and a second surface 114 opposite the first surface. A vertical waveguide 120 extends through the printed circuit board 110 from the first surface 112 to the second surface 114. As indicated by the arrow extending through waveguide 120, electromagnetic energy may be transferred through waveguide 120 in both directions.

Waveguide 120 preferably comprises a ridge waveguide. In other words, as described in greater detail below, waveguide 120 may comprise a ridge 125. Ridge 125 protrudes into the waveguide 120 from one of the sidewalls extending between surfaces 112 and 114.

An integrated circuit 130 is mounted to printed circuit board 110 on the upper surface 112. In preferred embodiments, integrated circuit 130 comprises a monolithic microwave integrated circuit (MMIC), which may be used to generate and/or receive electromagnetic signals that may be used, for example, to detect remote objects from a vehicle.

As described in greater detail below, MMIC 130 is preferably mounted to printed circuit board 110 using a surface mount packaging assembly, such as a ball grid array 140 or another array of solder elements or other preferably lead-free electrical coupling elements. Thus, in the cross-sectional view of FIG. 1, two solder balls are shown extending from surface 112 of printed circuit board 110 to MMIC 130. In preferred embodiments, at least one signal coupling element, such as signal solder ball 140*a*, may be positioned above and/or within the "footprint" (from a plan view perspective) of the ridge 125 of waveguide 120, as also shown in FIG. 1. Other balls of the ball grid array, such as ground ball 140*b*, may extend about MMIC 130 as desired. The solder balls of array 140 may comprise a height of about 0.2 mm in some embodiments.

One or more features may be provided in order to contain the electromagnetic signal being sent and/or received from MMIC 130, such as trenches or the like. Thus, in the depicted embodiment, trench 122 is provided along surface 112. Trench 122 is positioned adjacent to signal ball 140*a*, but may be positioned elsewhere and/or additional trenches may be positioned elsewhere in alternative embodiments as desired. In the depicted embodiment, trench 122 comprises a depth of about 0.8 mm, a width of about 0.6 mm, and a length of about 1.8 mm. In addition, trench 122 is about mm from the adjacent waveguide 120.

An antenna structure, such as waveguide antenna structure 150, may be positioned on surface 114 opposite MMIC 130. Antenna structure 150 may be configured to receive electromagnetic energy from the monolithic microwave via waveguide 120 and/or receive electromagnetic energy from the environment and direct it through waveguide 120 to MMIC 130. Antenna structure 150 may, in some embodiments, itself comprise one or more waveguides, such as waveguides defined by grooves/trenches or by two or more rows of posts defining a waveguide therebetween. One or more antenna slots 152 may be provided to allow for transmission and/or receipt of electromagnetic signals from assembly 100.

Figure 2:
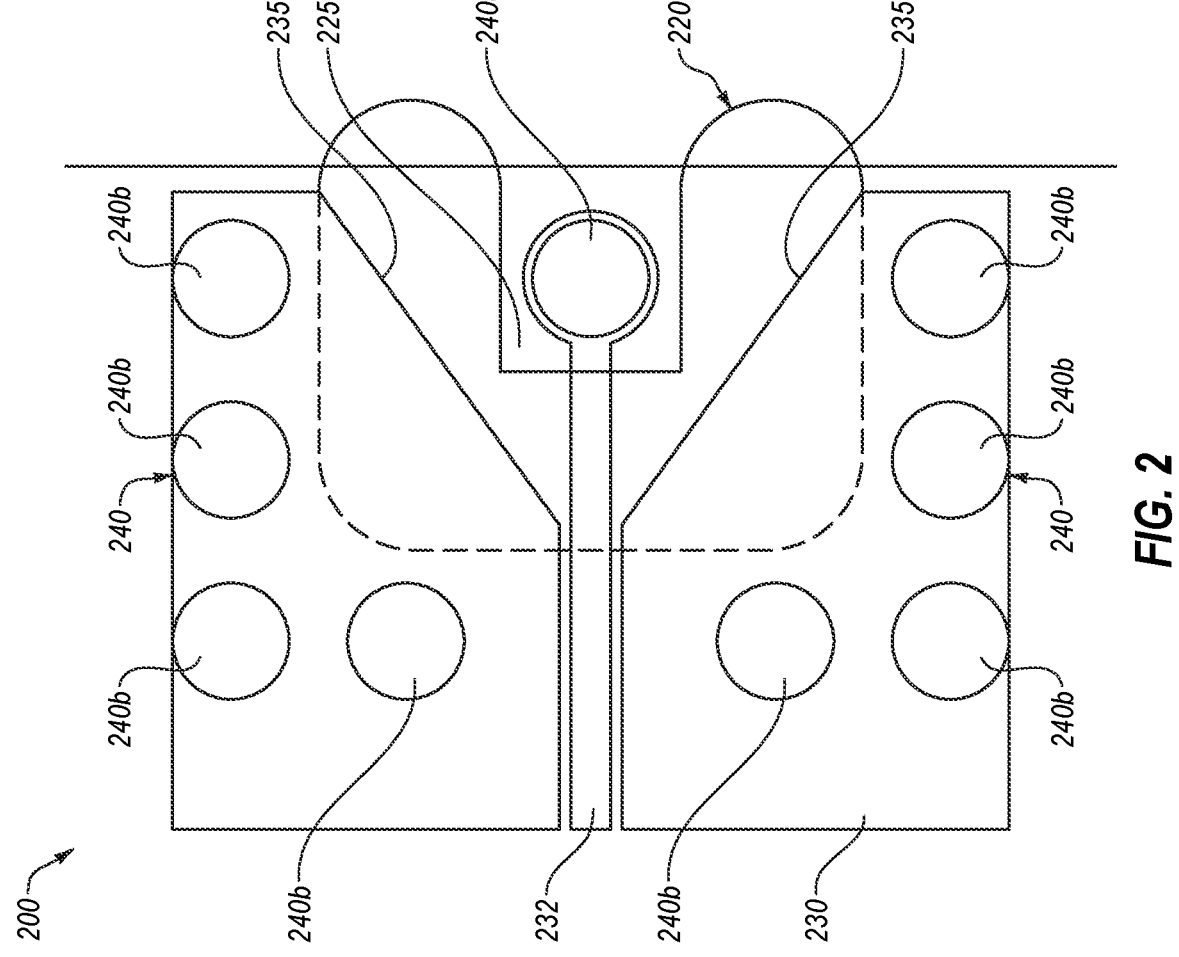
FIG. 2 depicts an interface between a vertical waveguide and a MMIC package for use in various embodiments of waveguide assemblies.

FIG. 2 illustrates the functional and positional relationships between a waveguide 220, MMIC 230, and ball grid array 240 of another sensor assembly 200 according to other embodiments. As previously mentioned, signal ball 240*a* is positioned above and within the footprint of ridge 225 of waveguide 220. The other solder balls, each of which is a ground ball 240*b*, is positioned in an array extending about the periphery of waveguide 220. In other words, each of the ground solder balls 240*b* is positioned above but having a footprint adjacent to the perimeter of waveguide 220.

As also shown in FIG. 2, a coplanar waveguide transmission line 232 from MMIC 230 extends and is electrically connected to signal ball 240*a*. On either side of transmission line 232, one or more metal layers in the MM IC 230 package may comprise a pair of chamfers 235 extending between opposite sides of the coplanar waveguide transmission line 232. Chamfers 235 are formed in the shape of a "V" with the base of the V being centered along transmission line 232. In addition, both chamfers 235 extend wholly within a footprint of the waveguide 220 above the waveguide 220. It is contemplated, however, that in alternative embodiments one or both chamfers may only partially extend within the footprint of waveguide 220.

Chamfers 235 may be used as tuning features in some embodiments. In other words, adjusting the location of the chamfers 235 along transmission line 232 may tune the matching frequency of the structure as desired. This tuning feature is described in greater detail below in connection with FIG. 4.

Figure 3:
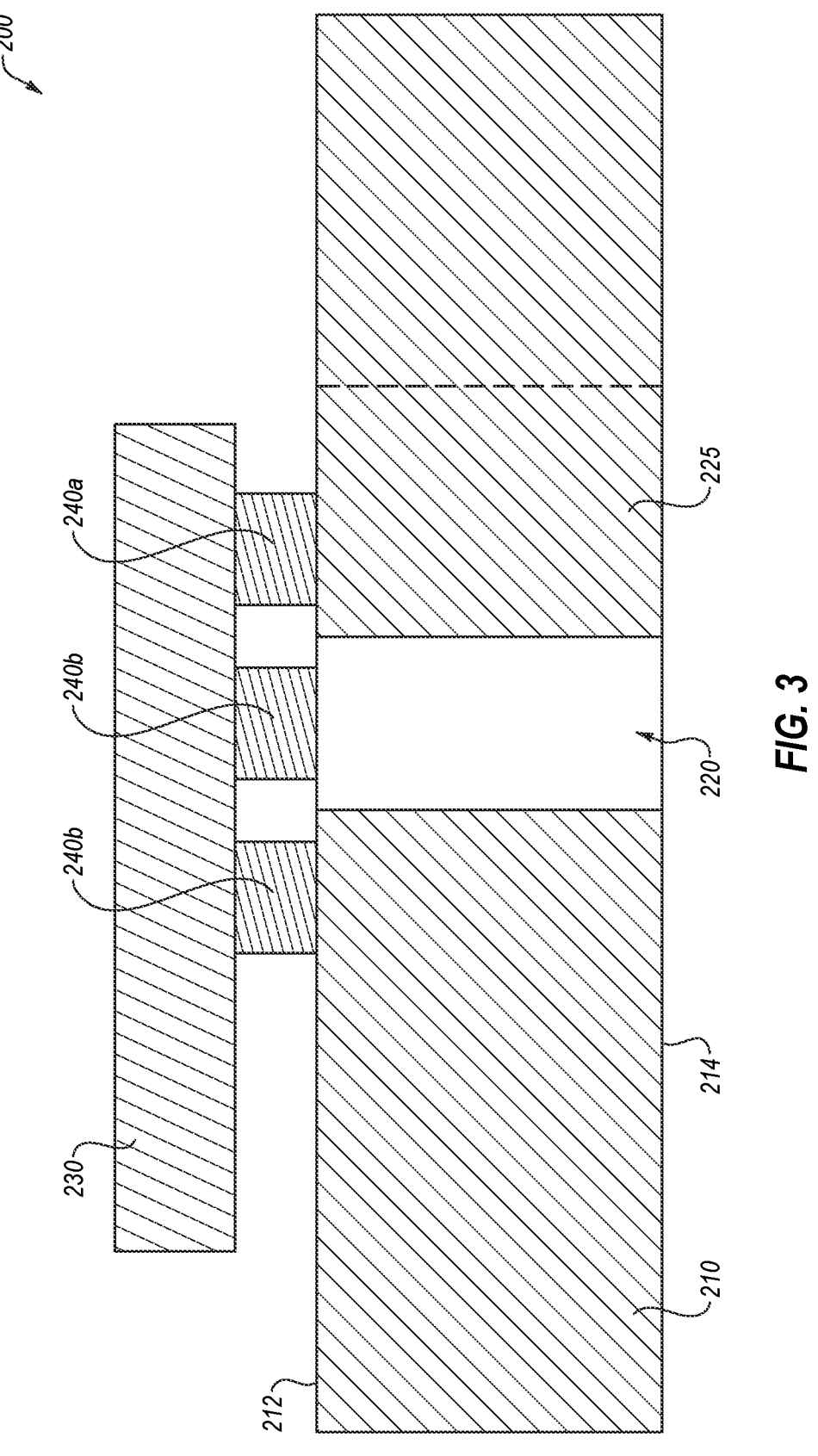
FIG. 3 is a cross-sectional view of another waveguide assembly according to other embodiments.

In the cross-sectional view of FIG. 3, three layers of the assembly 200 are depicted, including printed circuit board 210, ball grid array 240, and integrated circuit 230. Vertical waveguide 220 is shown extending from surface 212 to surface 214 of printed circuit board 210. In addition, signal ball 240*a* can be seen directly coupled to ridge 225 of waveguide 220. Although not depicted in FIG. 2, other elements described in connection with other embodiments disclosed herein, such as an antenna assembly, radiating slots, cover, trenches, etc.—many of which are described herein—may be included as desired. These elements are not shown in FIGS. 2 and 3 to avoid obscuring the aspects of these embodiments being illustrated in these figures.

Figure 4:
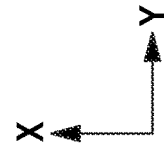
FIG. 4 depicts another interface between a vertical waveguide and a MMIC package for use in various embodiments of waveguide assemblies in which opposing chamfered edges of a conductive plate of a MMIC package are used for frequency tuning.

FIG. 4 illustrates the aforementioned tuning feature provided by the chamfered edges 235 of one or more conductive/metallic plates of MM IC 230. Chamfered edges 235 is in the position previously depicted. However, chamfered edges 235*a* are shown shifted towards signal ball 240*a* along transmission line 232 and chamfered edges 235*b* are shown shifted away from signal ball 240*a* along transmission line 232. Various ground balls 240*b* may extend in an array about vertical waveguide 220 to couple MM IC 230 with printed circuit board 210, as previously described.

Figure 5:
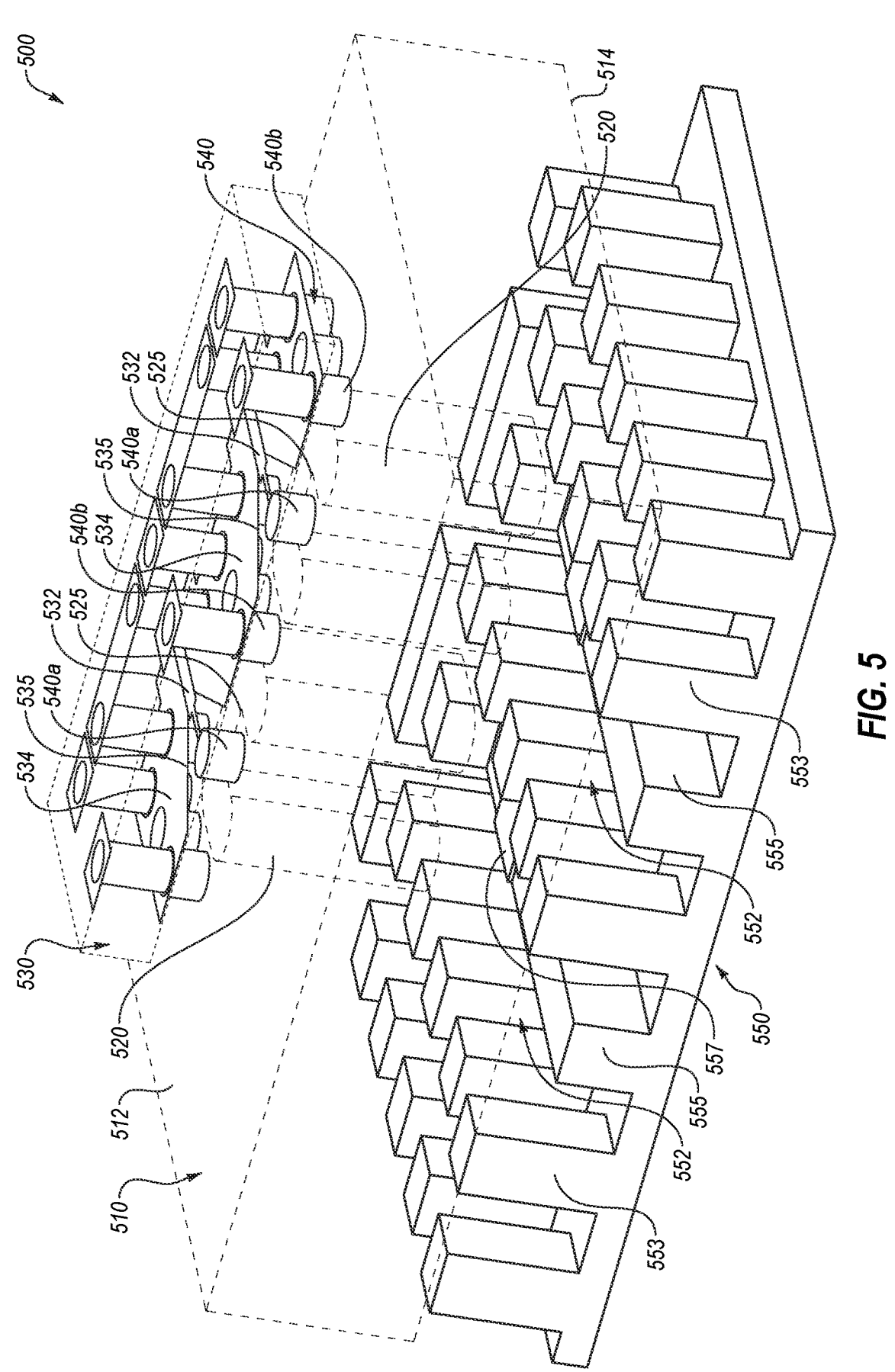
FIG. 5 depicts an alternative embodiment of a waveguide assembly illustrating an example of a horizontal waveguide structure comprising waveguides defined by posts and ridge structures.

FIG. 5 is a perspective view of another sensor assembly 500 according to still other embodiments. As shown in this figure, assembly 500 again comprises a printed circuit board 510 having a first surface 512 and a second surface 514 opposite the first surface. Printed circuit board 510 is shown in phantom to allow for better visualization of other elements and features of the assembly 500. Two vertical waveguides 520, each of which comprises a protruding ridge 525, extends through the printed circuit board 510 from the first surface 512 to the second surface 514.

An integrated circuit 530, such as a MMIC, is mounted to printed circuit board 510 on the upper surface 512. MM IC 530 is also shown in phantom to allow for better visualization of ball grid arrays 540 and conductive layers forming chamfers 535 within MMIC 530. Integrated circuit 530 is mounted to printed circuit board 510 using a ball grid array 540 comprising signal balls/elements 540*a* and ground balls/elements 540*b*. As previously described, signal balls 540*a* are positioned to be directly coupled with the ridges 525 of waveguides 520 and ground balls 540*b* are arranged in an array extending about the perimeters of the two adjacent waveguides 520. It should be understood that ridges 525 may be preferred to allow the waveguides 520 to be positioned closer to one another but may be omitted in alternative embodiments.

Each of the ground balls 540*b* is coupled with a metallic/conductive plate 534 extending along or adjacent to a lower surface of MM IC 530. As previously mentioned, plates 534 are preferably formed with angled/beveled chamfers 535. Chamfers 535 may be positioned opposite from one another to form a "V" shape, in some embodiments on opposite sides of a transmission line 532 and/or above and/or within a footprint of a waveguide 520 positioned below.

An antenna structure 550 is coupled to the circuit board 510 on its lower surface 514 opposite from MM IC 530. Antenna structure 550 itself comprises a plurality of waveguides 552 that may be configured to direct electromagnetic signals to, or receive electromagnetic signals from, one or more slots or other radiating openings formed in antenna structure 550. Although these slots are not shown in the figure, it is contemplated that they may extend along one or both waveguides 552, such as, for example, by extending in staggered rows along both sides of waveguide ridges 555.

In the depicted embodiment, each of waveguides 552 is defined by a row of posts 553 formed along opposing sides of a ridge 555. As those of ordinary skill in the art will appreciate, however, if good electrical contact can be maintained with the circuit board 510, solid walls may be used for waveguides 552 instead of posts.

Figure 6:
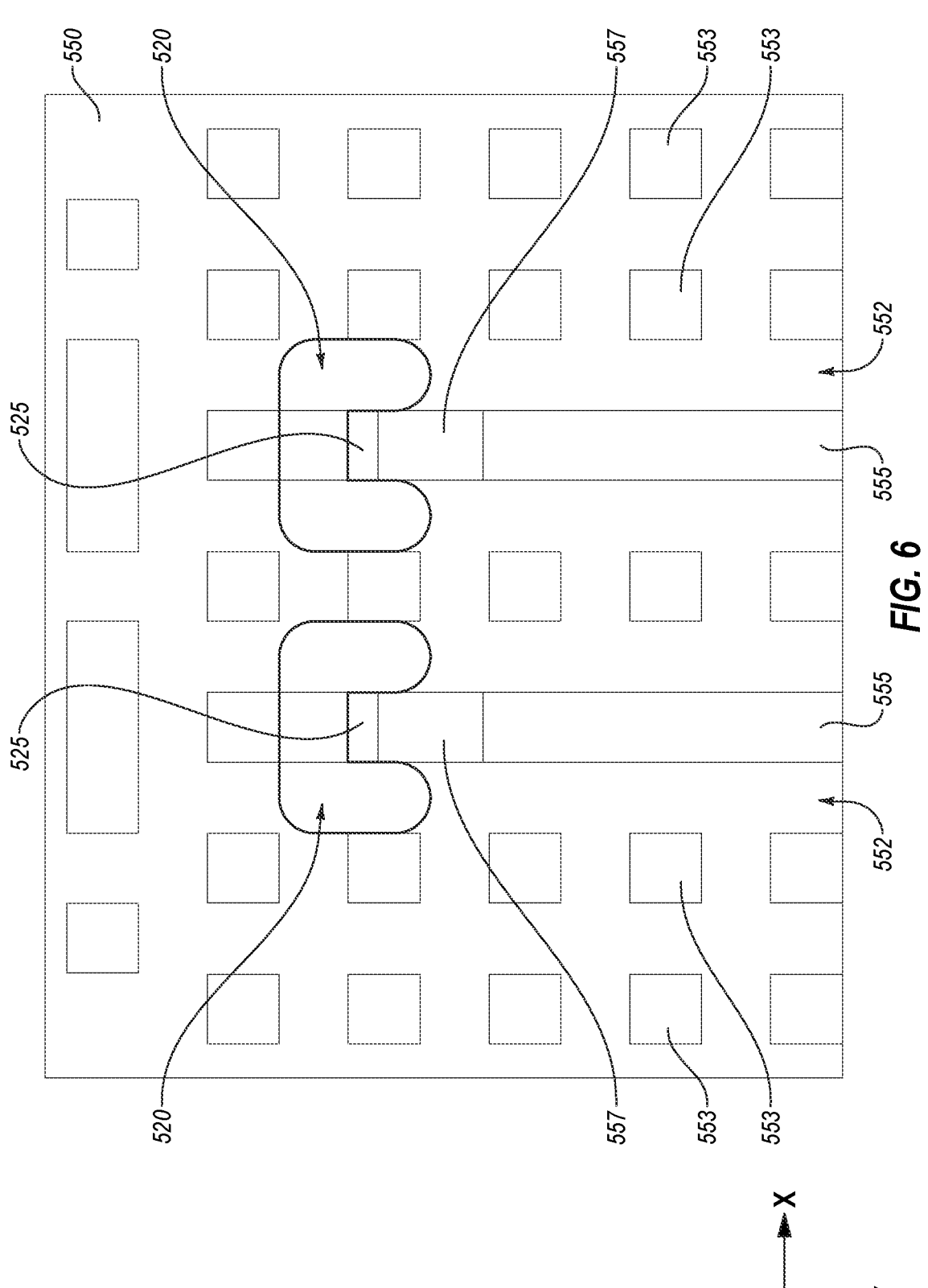
FIG. 6 is a top plan view illustrating the interface between a pair of vertical waveguides and corresponding, adjacent horizontal waveguides according to some embodiments.

The plan view of FIG. 6 illustrates the relative placement of vertical waveguides 520 and the underlying horizontal waveguides 552. In particular, preferably the ridges 555 of waveguides 552—which define the elongated center axes of waveguides 552—are aligned, or at least substantially aligned, with the ridges 525 of the vertical waveguides 520. In the depicted embodiment, a slightly protruding portion 557 or, "ridge on a ridge", may be formed on ridge 555, preferably at least partially overlapping with the vertical ridge 525 above.

Figure 7:
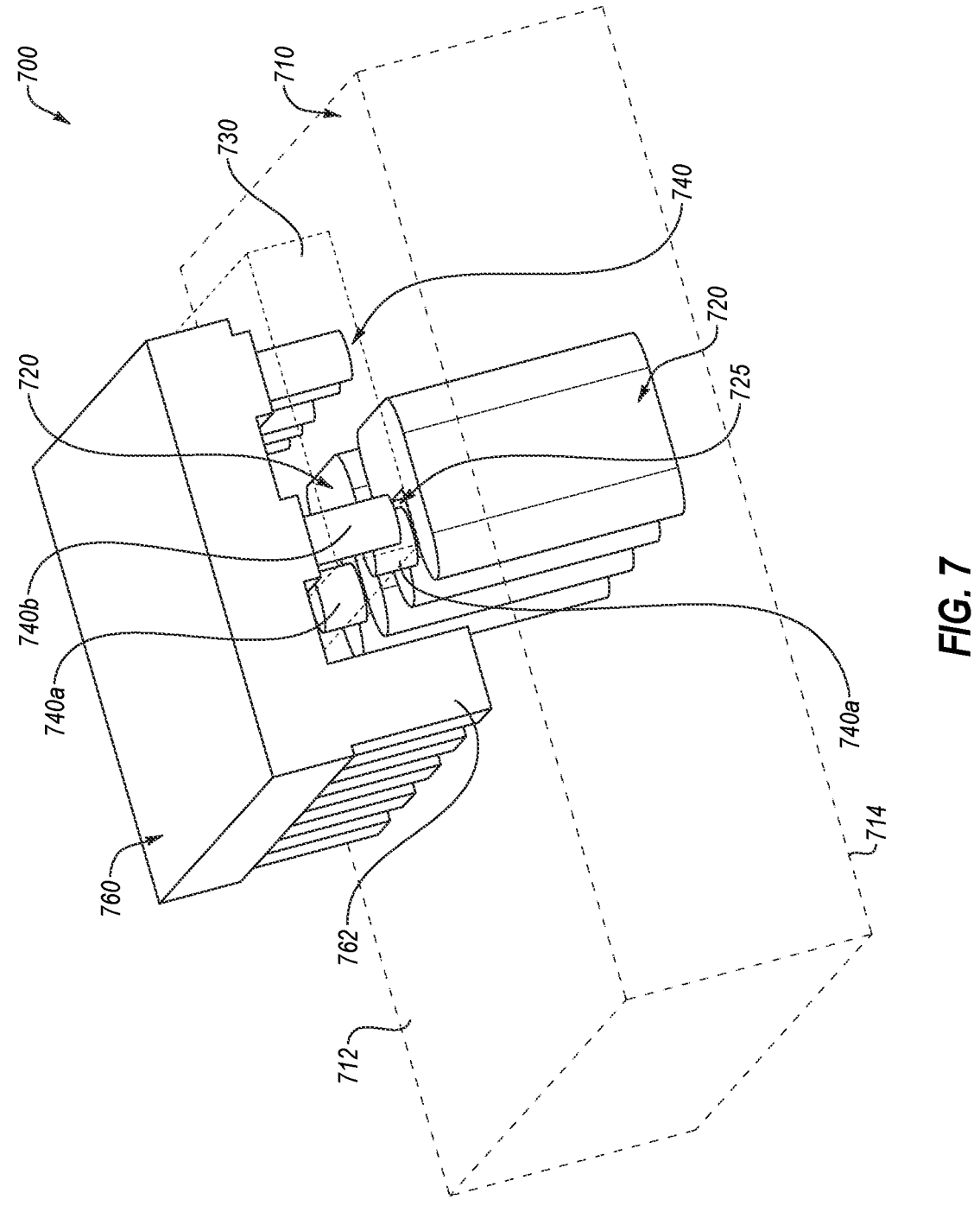
FIG. 7 depicts an alternative embodiment of a waveguide assembly comprising an integrated circuit cover to limit stray radiation.

FIG. 7 illustrates yet another example of a sensor assembly 700 according to some embodiments. Sensor assembly 700 is shown without all of the elements and features that would likely make up a complete sensor module, such as an antenna structure, in order to avoid obscuring the details pertinent to the disclosure of this embodiment.

Like previous embodiments, sensor assembly 700 comprises a printed circuit board 710 having a first surface 712 and a second surface 714 opposite the first surface. Again, a pair of vertical waveguides 720, each of which comprises a protruding ridge 725, extends through the printed circuit board 710 from the first surface 712 to the second surface 714.

An integrated circuit 730, such as a MMIC, is mounted to printed circuit board 710 on surface 712. Integrated circuit 730 may be mounted to printed circuit board 710 using a ball grid array 740 comprising signal balls/elements 740a and ground balls/elements 740b. As previously described, signal balls 740a are positioned to be directly coupled with the ridges 725 of waveguides 720 and ground balls 740b are arranged in an array extending about the perimeters of the two adjacent waveguides 720.

However, unlike previously depicted embodiments, assembly 700 further comprises a cover structure 760. Cover 760 may serve a purpose similar to that of the trench 122 of assembly 100 by confining, or at least inhibiting/limiting stray electromagnetic radiation. Although cover 760 is shown in the depicted embodiment as being a separate element, it is contemplated that, in some embodiments, such as embodiments in which the MMIC package 730 supports multiple metal layers, this cover structure can be formed in the MMIC package 730 itself.

Cover 760 comprises a series of columns 762 that together form a sidewall for confining stray radiation. Columns 762 may be rectangular in shape and may form a "metamaterial" to allow cover 760 to be close to printed circuit board 710 without making physical contact with printed circuit board 710. Although it is conceivable that this could vary in alternative embodiments, this feature may be important for certain applications because the height of the MMIC 730 above the circuit board 710 may vary slightly due to, for example, how much solder is in each of the solder balls of ball grid array 740.

The size and spacing of the columns 762 may depend on the frequency/wavelength of the electromagnetic radiation that is being confined. For use in the automotive RADAR band at 76 to 77 GHz, columns 762 may be about 0.5 mm×0.5 mm×0.85 mm. It should also be understood that, whereas only a single sidewall formed by columns 762 is shown in assembly 700, additional sidewalls may be formed along one or more of the other sides as desired. In some embodiments, MMIC 730 may be confined on all sides by columns 762, or by other sidewalls that need not be defined by spaced columns in all cases. It is also contemplated that projections and/or holes may be provided in columns and/or circuit board 710 in order to ensure a stable coupling between cover 760 and circuit board 710 if desired. This may help to confine the radiation more fully from MMIC 730. Preferably, at least a portion of cover 760, such as columns 762, is formed from a metal or at least comprises a metal (a metal-plated plastic, for example).

Figure 8:
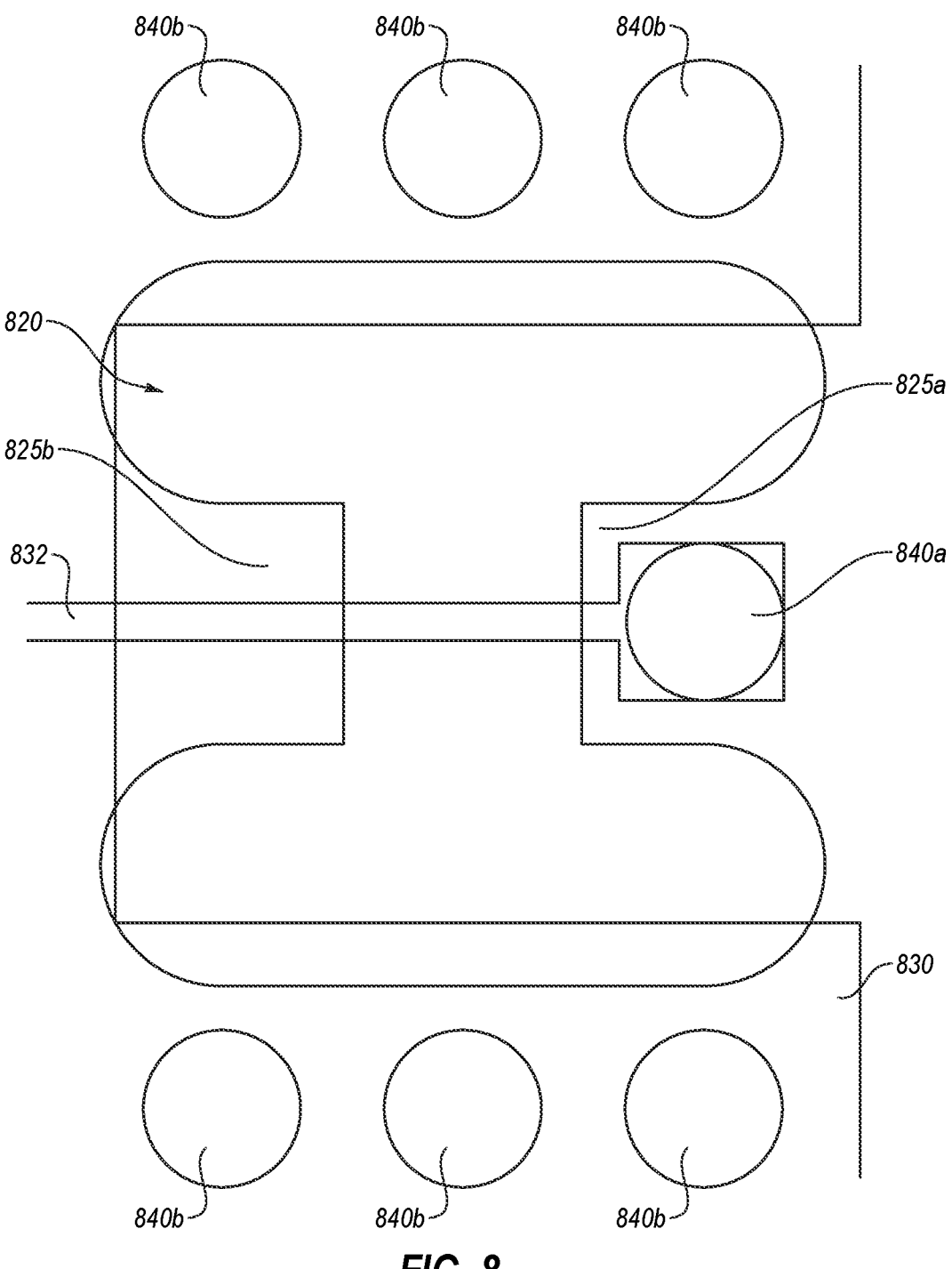
FIG. 8 depicts another alternative vertical waveguide and its associated array of solder balls according to other embodiments.

FIG. 8 depicts certain alternative structures that may be used in place of the structures of any of the other embodiments described herein, or other sensor assemblies. The assembly components depicted in FIG. 8 include an alternative vertical waveguide 820 comprising two opposing ridges 825a and 825b. A ball grid array 840 is providing including one or more signal balls/elements 840a and one or more ground balls/elements 840b. Again, preferably, a signal ball 840a is positioned on one of the ridges of the vertical waveguide 820. In this case, signal ball 840a is positioned on ridge 825a and is electrically coupled with a transmission line 832. The opposing ridge, ridge 825b, lacks a corresponding ball/conducting piece. However, in some embodiments, a ground ball 840b may be positioned on ridge 825b. The remaining solder balls of array 840 are positioned in lines on opposite sides of vertical waveguide 820. A portion of the adjacent MMIC or other integrated circuit 830 to which waveguide 820 is operably coupled is also shown in FIG. 8.

Figure 9:
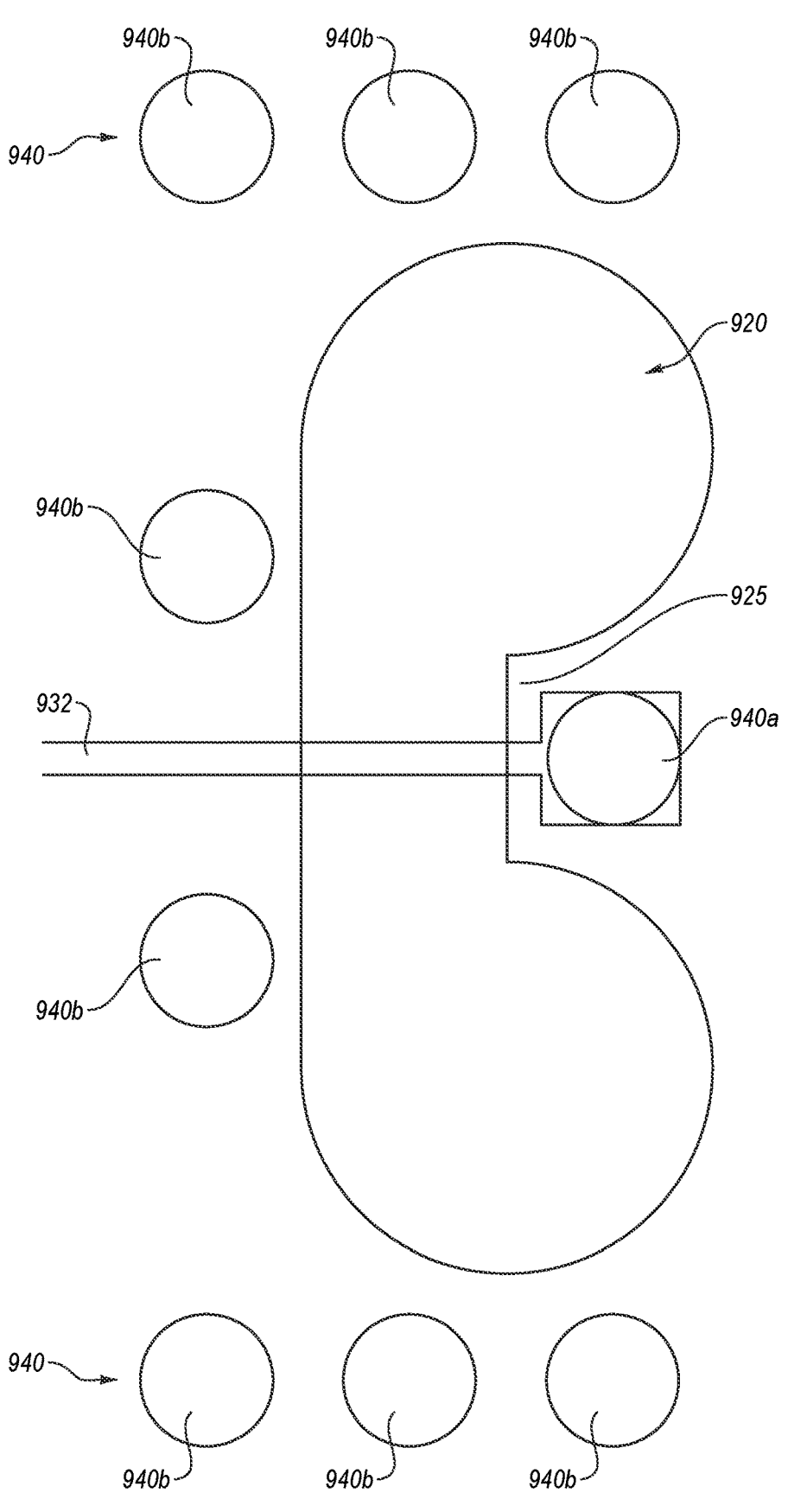
FIG. 9 depicts still another alternative vertical waveguide and its associated array of solder balls according to other embodiments.

Still another example of alternative structures and relative placement of various structures of a sensor assembly are shown in FIG. 9. This figure shows another alternative vertical waveguide 920 and corresponding array 940 of solder balls. Waveguide 920 comprises a ridge 925 defined by non-parallel sidewalls. More particularly, ridge 925 decreases in width from a base of the ridge to a tip of the ridge opposite the base.

The array 940 of solder balls again comprises a signal ball 940a that is positioned on ridge 925 and is electrically coupled to a MMIC signal/transmission line 932. The remaining balls of array 940 may comprise ground balls 940b and extend along a first side of vertical waveguide 920 opposite from ridge 925 in a first row, along with two opposing rows along sides of vertical waveguide 920 extending normal to the aforementioned first side.

Figure 10:
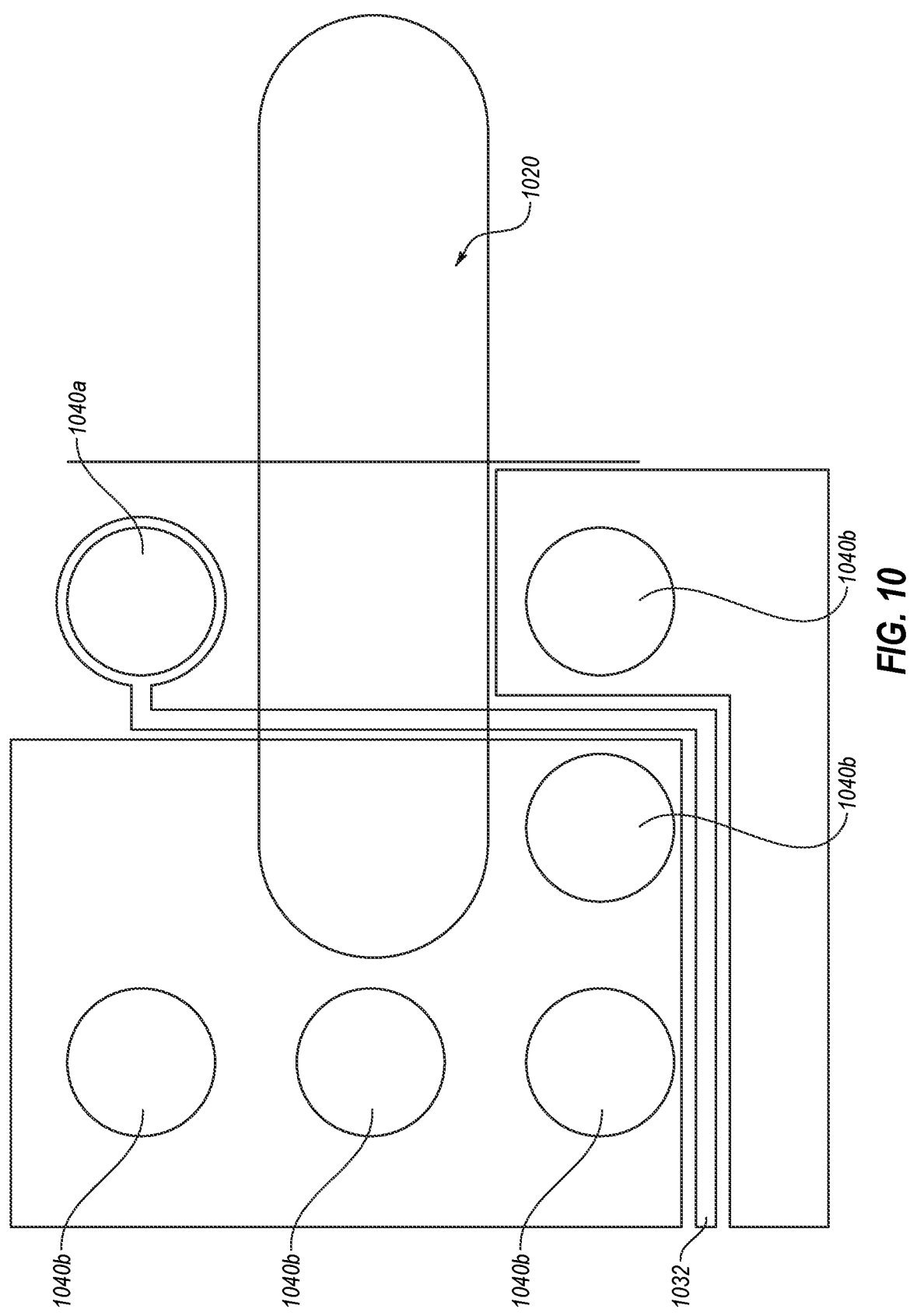
FIG. 10 depicts yet another alternative vertical waveguide lacking ridges and its associated array of solder balls according to other embodiments.

Yet another example of alternative structures and relative placement of various structures of a sensor assembly are shown in FIG. 10. This figure shows another alternative vertical waveguide 1020 and corresponding array of solder balls. Unlike each of the previously depicted embodiments, waveguide 1020 lacks a ridge.

The array of solder balls again comprises a signal ball 1040a that is electrically coupled to a MMIC signal/transmission line 1032. A ground ball 1040b is positioned on an opposite side of waveguide 1020. The remaining balls of array comprise ground balls 1040b and extend along two intersecting rows along a portion of an elongated axis of vertical waveguide 1020 and a terminal end of vertical waveguide 1020.

Figures 11, 12, 13:
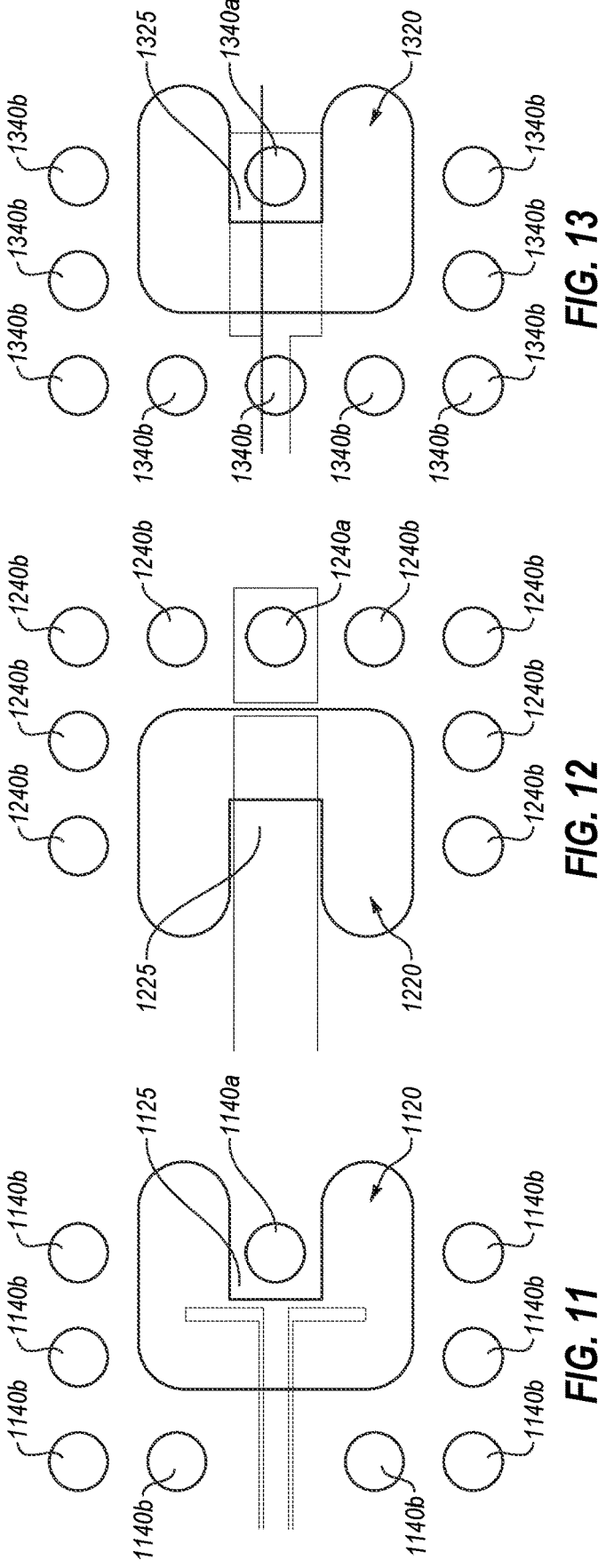
FIGS. 11-13 depict other examples of vertical waveguide and solder ball arrays for use in connection with various waveguide assemblies.

Still other examples of alternative structures and relative placement of various structures of a sensor assembly are shown in FIGS. 11-13. FIG. 11 depicts a vertical waveguide 1120 and corresponding array of solder balls. Waveguide 1120 comprises a ridge 1125 protruding from one side of the waveguide 1120 to define a "U" shape in cross section, as previously mentioned.

The array of solder balls again comprises a signal ball 1140a that may be electrically coupled to a MMIC signal/transmission line. The side of waveguide 1120 opposite signal ball 1140a is devoid of solder balls. The remaining balls of array comprise ground balls 1140b and includes three intersecting rows, two of which extend along opposite sides of vertical waveguide 1120 and the last of which extends partially along a line intersecting the first two rows.

Vertical waveguide 1220 of FIG. 12 also comprises a ridge 1225 and an array of solder balls. The array of solder balls may again comprise a signal ball 1240a that may be electrically coupled to a MMIC signal/transmission line. In this embodiment, the ridge 1225 is lacking in solder balls and the signal ball 1240a is positioned adjacent ridge 1225 on the opposite side of waveguide 1220.

The remaining balls of array comprise ground balls 1240b, including adjacent ground balls 1240b in the same row as signal ball 1240a, along with two intersecting rows or columns extending adjacent to opposing sides of waveguide 1220 at the opposing ends of the aforementioned row including signal ball 1240a.

Yet another example of a vertical waveguide 1320 is shown in FIG. 13. This example is similar to that of FIG. 11 in that a signal ball 1340a of an array 1340 of solder balls is positioned on ridge 1325. The side of waveguide 1320 opposite signal ball 1340a, however, unlike waveguide 1120, comprises a ground ball 1320b positioned at a central location within a row of ground balls 1320b. Two additional rows or columns of ground balls 1320b extend along opposing sides of vertical waveguide 1320 at respective ends of the aforementioned row of ground balls 1320b.

As those of ordinary skill in the art will appreciate, whereas preferred embodiments of the inventions disclosed herein may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle sensor assembly, comprising:
a printed circuit board comprising a first surface and a second surface opposite the first surface;
a monolithic microwave integrated circuit coupled to the printed circuit board on the first surface;
a waveguide extending through the printed circuit board from the first surface to the second surface; and
an antenna structure, the antenna structure being separate from the printed circuit board and coupled with the printed circuit board, wherein the waveguide is configured to receive electromagnetic energy from the monolithic microwave integrated circuit and inject the electromagnetic energy into the antenna structure, and wherein the waveguide comprises a ridge waveguide comprising at least one ridge protruding into the waveguide and extending longitudinally along the waveguide along a propagation direction of the waveguide from the first surface to the second surface.

2. The vehicle sensor assembly of claim 1, wherein the waveguide comprises two opposing ridges protruding into the waveguide and extending along the waveguide between the first surface and the second surface.

3. The vehicle sensor assembly of claim 1, further comprising a ball grid array package comprising an array of solder balls electrically coupling the monolithic microwave integrated circuit to the printed circuit board.

4. The vehicle sensor assembly of claim 3, wherein the waveguide comprises a ridge waveguide comprising a ridge protruding into the waveguide and extending along the waveguide between the first surface and the second surface, wherein the ball grid array package comprises a signal ball, and wherein the signal ball is positioned on the ridge.

5. The vehicle sensor assembly of claim 1, wherein the monolithic microwave integrated circuit comprises:
a coplanar waveguide transmission line; and
a pair of chamfers extending between opposite sides of the coplanar waveguide transmission line.

6. The vehicle sensor assembly of claim 5, wherein both chamfers of the pair of chamfers extends at least partially within a footprint of the waveguide above the waveguide.

7. The vehicle sensor assembly of claim 6, wherein both chamfers of the pair of chamfers extends wholly within the footprint of the waveguide.

8. A sensor assembly, comprising:
a printed circuit board;
an integrated circuit coupled to the printed circuit board on a first surface of the printed circuit board;

an antenna coupled to the printed circuit board on a second surface of the printed circuit board opposite the first surface; and a waveguide extending through the printed circuit board from the integrated circuit to the antenna, wherein the waveguide is configured to deliver electromagnetic energy between the integrated circuit and the antenna, wherein the waveguide comprises at least one ridge extending along the waveguide, and wherein the at least one ridge extends to the first surface of the printed circuit board.

9. The sensor assembly of claim 8, further comprising an array of electrical coupling elements used to electrically couple the integrated circuit to the printed circuit board.

10. The sensor assembly of claim 9, wherein the array of electrical coupling elements comprises a ball grid array.

11. The sensor assembly of claim 10, wherein one of the balls of the ball grid array is positioned within a footprint of a ridge of the at least one ridge.

12. The sensor assembly of claim 8, wherein the integrated circuit comprises a monolithic microwave integrated circuit.

13. The sensor assembly of claim 8, further comprising an integrated circuit cover positioned adjacent to the integrated circuit and configured to inhibit stray electromagnetic radiation from the integrated circuit, wherein the integrated circuit is positioned in between the integrated circuit cover and the printed circuit board.

14. The sensor assembly of claim 8, further comprising a groove formed within the printed circuit board adjacent to but spaced apart from the integrated circuit, wherein the groove is configured to inhibit stray electromagnetic radiation from the integrated circuit.

15. A vehicle RADAR sensor assembly, comprising:

a printed circuit board comprising a first surface and a second surface opposite the first surface;

a monolithic microwave integrated circuit;

a ball grid array package electrically coupling the monolithic microwave integrated circuit to the printed circuit board on the first surface;

a waveguide positioned adjacent to the monolithic microwave integrated circuit and extending through the printed circuit board from the first surface to the second surface;

a ridge extending along the waveguide, wherein the ridge extends within and along a propagation direction of the waveguide and terminates at the first surface of the printed circuit board; and an antenna structure comprising one or more waveguides, the antenna structure coupled to the second surface of the printed circuit board and configured to facilitate transfer of electromagnetic energy to and from the monolithic microwave integrated circuit.

16. The vehicle RADAR sensor assembly of claim 15, wherein the ball grid array package comprises at least one signal ball, and wherein at least one signal ball is positioned within a footprint of the ridge.

17. The vehicle RADAR sensor assembly of claim 15, wherein the ridge is defined by at least substantially parallel opposing sidewalls.

18. The vehicle RADAR sensor assembly of claim 15, wherein the ridge decreases in width from a base of the ridge to a tip of the ridge opposite the base.

19. The vehicle sensor assembly of claim 1, wherein the at least one ridge extends between the first surface and the second surface so as to span an entire distance between the first surface and the second surface.

20. The vehicle RADAR sensor assembly of claim 15, wherein the waveguide and the waveguide ridge terminate at an opening in the printed circuit board at the first surface of the printed circuit board such that the opening exposes an end of the waveguide and a corresponding end of the waveguide ridge.

* * * * *